United States Patent [19]
Bernadic et al.

[11] Patent Number: 5,456,557
[45] Date of Patent: Oct. 10, 1995

[54] CUTTING INSERT

[75] Inventors: Thomas Bernadic, Madison Hts.; Tony Lowe, Royal Oak; John Patterson, Hazel Park, all of Mich.

[73] Assignee: Valenite Inc., Madison Heights, Mich.

[21] Appl. No.: 287,819

[22] Filed: Aug. 9, 1994

[51] Int. Cl.[6] ............................... B26D 1/00; B26D 3/00
[52] U.S. Cl. ............................................ 407/114; 407/115
[58] Field of Search ............................... 407/113, 114, 407/115, 116, 117

[56] References Cited

U.S. PATENT DOCUMENTS

| | | | |
|---|---|---|---|
| 3,866,282 | 2/1975 | Lundgren | 407/113 |
| 4,056,871 | 11/1977 | Bator | 407/114 |
| 4,247,232 | 1/1981 | McCreery et al. | 407/114 |
| 4,259,033 | 3/1981 | McCreery et al. | 407/114 |
| 4,359,300 | 11/1982 | Hazra et al. | 407/114 |
| 4,479,744 | 10/1984 | Stricker | 407/114 |
| 4,626,141 | 12/1986 | Malaker et al. | 407/114 |
| 4,685,844 | 8/1987 | McCreery et al. | 407/115 |
| 4,787,784 | 11/1988 | Bernadic et al. | 407/114 |
| 5,000,626 | 3/1991 | Bernadic et al. | 407/114 |
| 5,044,839 | 9/1991 | Takahashi | 407/114 |
| 5,180,258 | 1/1993 | Bernadic | 407/114 |

OTHER PUBLICATIONS

Michael Gadzinski, Smaller Tools for Turning, Oct. 1992, pp. 35, 36, 38, Cutting Tool Engineering.

Primary Examiner—Bruce M. Kisliuk
Assistant Examiner—Christopher W. Day
Attorney, Agent, or Firm—John W. Gregg

[57] ABSTRACT

An indexable cutting insert having a polygonal body including top and bottom surfaces connected by a peripheral wall having sides and corners. In a generally diamond shaped embodiment, opposite acutely angled corners and the adjacent sides form cutting edges at their junctures with the top surface, forming noses at the corners. A narrow cutting land extends inward from each cutting edge and slopes downward from the nose along both adjacent sides. A chip groove includes a pair of wedge faces, sloping downwardly from the cutting land to a flat floor and a radius blend juncture aligned with the nose and bisecting the adjacent sides. A pair of chipbreaker faces slope upward from the flat floor and backward from a ridge that connects the chipbreaker faces and is upwardly aligned with the juncture of the cutting faces. Various additional features are also disclosed.

8 Claims, 2 Drawing Sheets

CUTTING INSERT

FIELD OF THE INVENTION

This invention relates to cutting inserts for metal cutting and, more particularly, to a cutting insert having a chip control geometry with improved features.

BACKGROUND OF THE INVENTION

It is known in the art relating to metal cutting to use disposable cutting inserts which are detachably clamped on a holder and discarded when they become dull or chipped. Throw away inserts are usually reversible so that an insert can be provided with at least two cutting edges for selective presentation of the cutting edges to the cutting position.

It is desired to provide new small nose radius inserts of this type having chip grooves designed to control chips on very light-feed and depths of cut and eliminate part distortion when machining thin walled parts and to provide enhanced chip control.

SUMMARY OF THE INVENTION

The present invention provides a small nose radius cutting insert having pressed in chip groove designs which provide a narrow cutting land inwardly adjoining sharply angled wedge surfaces having a positive shear angle on the rake face, along with a small nose radius. The combination helps reduce radial cutting force and heat generated when machining high temperature alloy materials requiring good surface finish and close part tolerances. Recommended uses include turning and profiling of low carbon steels, stainless steels, and high temperature alloy materials at low to moderate cutting speeds, very shallow depths of cut and very low feed rates. The constant cutting land helps maintain edge integrity on both the corner radius and along its flanks on adjacent sides of the insert body.

The chip grooves are designed to increase the life of the cutting tool by controlling the removed work piece material into forming small manageable coils that flow away from the work piece and break as a result of hitting the tool holder or machine turret. The designs are two handed so that they can be used for turning and profiling in both directions. While the inserts must be ground to maintain a required precision tolerance, slight misalignment during the grinding process will not adversely affect the machining performance since the chip breaker and cutting land are pressed in and thus are consistent from the cutting edge to the bottom.

It is therefore a feature of the invention to provide a cutting land including a cutting edge extending from a corner radius along both adjacent sides of the insert and having inwardly adjacent wedge faces with a double positive shear angle. The positive shear angle of the wedge faces on the rake face, helps enhance the small force distribution and initiates chip breaking by directing and bending the work piece material toward the center of the chip breaker form and away from the work piece. A radius blend at the juncture of the intersecting wedge faces provides the cutting insert with maximum chip control performance at very low feed rates and depths of cut.

A further feature is that the cutting edge and the cutting land define a shallow descending angle from the center of the nose radius along both adjacent sides to the depth of the chip groove which provides a constant decrease in cutting edge height. Since the center line of the nose radius is the shearing off point for removed workpiece material, the decreasing cutting edge height enhances chip control by deflecting the existing chips back away from the workpiece.

A still further feature of the invention is a substantial height differential or delta drop from a plateau at the top of the insert to the lower cutting edge at the nose. Since the bottom of the chip groove is below the nose, the chipbreaker height from the flat bottom of the chip groove to the plateau is even greater. This, combined with the positive shear angle of wedge faces on the rake face, directs the work piece material to flow down and away from the work piece and aids in chip control. This multi-faceted chip groove prevents the machined material from sliding past the trailing edge of the chip groove during light feeds and depths of cut.

Another feature of the invention is that chip breaker faces are provided which angle upwardly and rearwardly from a central ridge aligned with the nose of the insert to aid in directing chips away from the work piece. Preferably, the chipbreaker faces are planar, sloping upwardly and rearwardly from the ridge. The two angled surfaces form a V-type incidence angle which enhances chipbreaking capability, directing chips up and away from the center of the chip groove toward the outer edge. The design provides flexibility in that the ridge defined by the intersecting surfaces may be moved, in various embodiments, closer to or farther from the nose radius to accomodate the needs of various applications and depths of cut. This can be done without changing the length of the cutting edge along the sides of the insert to maintain a desired length of the chip groove.

These and other features and advantages of the invention will be more fully understood from the following detailed description of the invention taken together with the accompanying drawings.

DETAILED DESCRIPTION OF THE INVENTION

Figure 1:
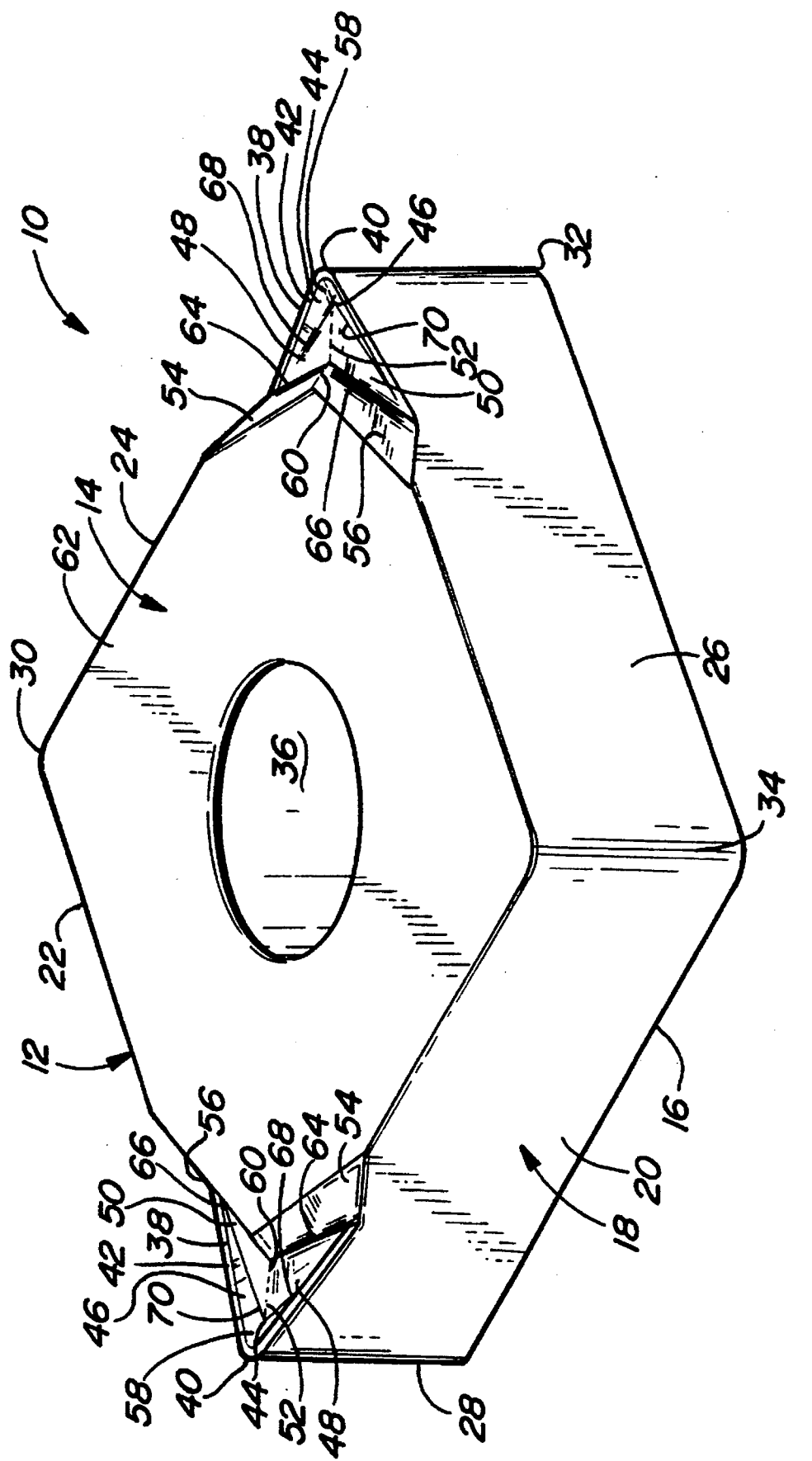
FIG. 1 a perspective view of a cutting insert made in accordance with the present invention.

Referring now to the drawings in detail, numeral 10 generally indicates an indexable cutting insert for use with cutting tools for turning and profiling of low carbon stampings, stainless steels, and high temperature alloy materials at low to moderate cutting speeds, shallow depths of cut and low feed rates.

Figure 2:
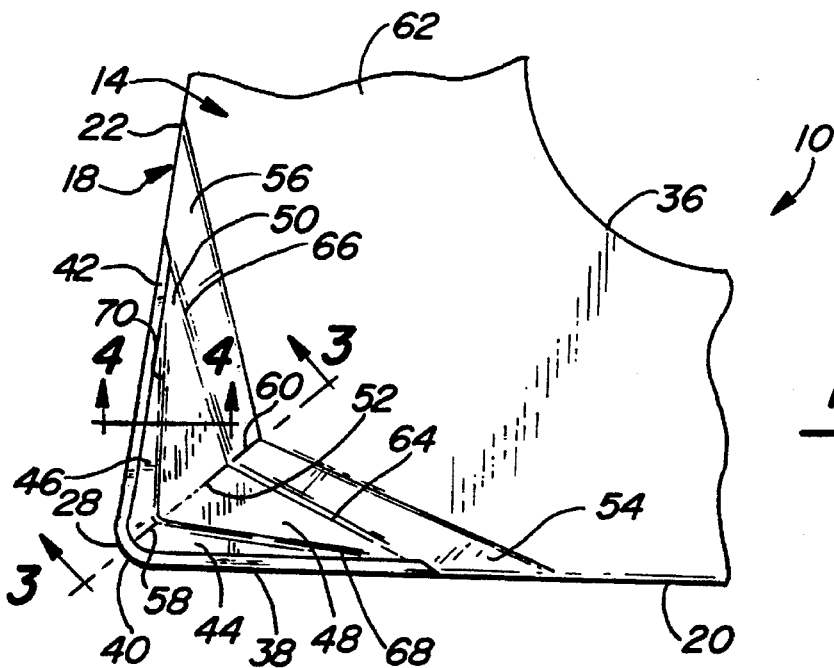
FIG. 2 is a plan view of the insert of FIG. 1.
Figure 3:
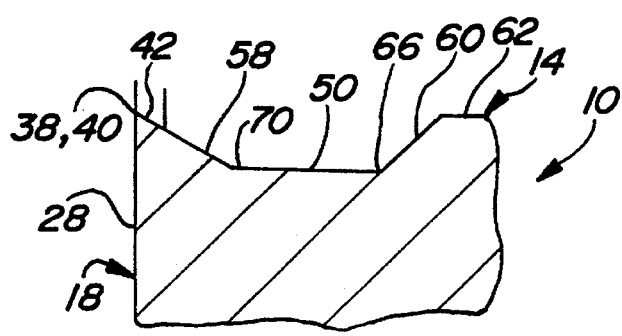
FIG. 3 is a cross-sectional view through the nose of the cutting edge taken in the plane indicated by the line 3—3 of FIG. 2.
Figure 4:
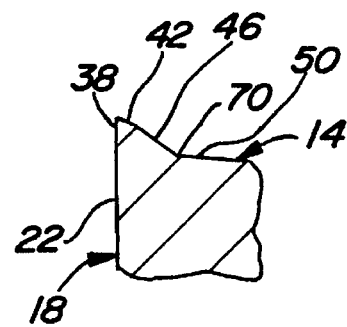
FIG. 4 is a cross-sectional view through the cutting edge taken in the plane indicated by the line 4—4 of FIG. 2.

As illustrated in FIGS. 1 thru 4, insert 10 includes a generally polygonal body 12 having top and bottom surfaces 14, 16 respectively connected by a peripheral wall 18. The peripheral wall 18 is generally diamond shaped and includes four sides, 20, 22, 24, 26 connected by four radiused corners 28, 30, 32, 34. A central opening 36 is provided through the insert for securing it to a tool holder or machine turret.

The opposite corners 28, 32 comprise the sharper acutely angled corners of the diamond shaped insert. At these corners, 28, 32, the corners and the adjacent sides of the peripheral wall form a pair of first junctures with the top surface 14 to define cutting edges 38, each having a nose 40 at its respective radiused corner. Inwardly of and adjoining each cutting edge 38, the top surface 14 defines a narrow cutting land 42 having a generally upward facing surface and sloping downward at a shallow angle from its respective nose 40 for a predetermined distance along each of the adjacent sides of the body.

A chip groove is also formed on the top surface 14 extending inward from the cutting land 42. The chip groove includes a pair of generally triangular left and right hand wedge faces 44, 46, respectively, a flat floor formed by a pair of coplanar left and right hand generally triangular sections 48, 50 joined by an imaginary common base 52, and a corresponding pair of left and right hand chipbreaker faces 54, 56.

The left hand and right hand wedge faces 44, 46, each slope downwardly with a positive shear angle from the inner edge of the cutting land 42, adjacent to the associated sides of the insert, to the sections 48, 50 of the flat floor and to a second juncture with one another formed as a small radius blend 58 that is aligned with the associated nose 40 and bisects the adjacent sides 20, 22 or 24, 26.

The chipbreaker faces 54, 56 each slope upward from the associated sections of the flat floor and laterally backward from a ridge 60 connecting the chipbreaker faces and aligned, in an upward direction, with the radius blend 58. The chipbreaker faces 54, 56 extend upwardly to a plateau 62 of the body top surface which is substantially higher than the cutting edge 38.

At their lower edges, the chipbreaker faces 54, 56 connect with their respective sections 48, 50 of the flat floor at 3rd and 4th junctures which, again, are formed as small radius blends 64, 66 that angle outwardly from a base of the ridge 60 (at the flat floor) to the sides of the body at outer ends of the respective cutting edges 38. The floor sections 48, 50 also connect with corresponding ones 44, 46 of the wedge faces at fifth and sixth junctures formed as radius blends 68, 70 extending at opposite angles from the second juncture to near the ends of the respective cutting lands.

Preferably the cutting edge 38 and the associated cutting land 42 slope downwardly from the nose 40 to their distal ends at a common angle in the range from about 10–15 degrees. In the illustrated embodiment, the angle is about 13 degrees and is selected to provide desired conditions of reduced radial force and heat generation together with long tool life and chip control. Also, the radius blends 50, 56, 58 are suitably formed with radii within a range of about 0.005 to 0.050 inch or, preferably, about 0.010 inch radius.

The chipbreaker faces 54, 56, as shown, are planar and angle outward and backward from the ridge 60 to the adjacent sides of the insert. The faces 54, 56 also slope upwardly from the radius blends 64, 66 to the plateau 62 which forms the highest portion of the upper surface of the insert. In the illustrated embodiment, the ridge 60 slopes upward at an angle of about 47 degrees from the parallel planes of the flat floor and the plateau 62. The angles of the faces 54, 56 with the flat floor are correspondingly steeper in view of their angular intersection with the ridge. These angles can, of course, be varied if desired where variations in the V angle of the chipbreaker faces are desired. Also, the various dimensions of the illustrated embodiment can, of course, be varied to suit the varying materials, speeds and cuts to which cutting inserts according to the invention may be applied.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A cutting insert comprising:

a generally polygonal body including top and bottom surfaces connected by a peripheral wall having sides and corners, at least one of said corners being radiused;

a cutting edges defined at a radiused corner by a first juncture of adjacent sides and the top surface, the cutting edge forming a nose at the radiused corner and extending a limited distance along each of the adjacent sides;

a cutting land adjoining the cutting edge, said—cutting— land and the cutting edge sloping downward from the nose along both of said adjacent sides;

a pair of wedge faces, each sloping inward and downward from the cutting land along an adjacent side, the wedge faces having a second juncture with one another aligned with the center line of the nose;

a flat floor inwardly adjacent the wedge faces and extending to near the ends of the cutting land;

a pair of chipbreaker faces, each sloping upward between the flat floor and the top surface to a portion thereof higher than the cutting edge and—extending—backward—from a ridge connecting the chipbreaker faces—to the adjacent side—s—near the respective end of the—cutting—land, the chipbreaker faces connecting with the flat floor at respective third and fourth junctures;

—said—ridge connecting the chipbreaker faces—being—aligned with said second juncture;

a chip groove formed in the top surface inward from the cutting land and defined by said wedge faces,—said— flat floor and—said pair of— chipbreaker faces.

2. The insert of claim 1 wherein said flat floor is formed by a pair of coplanar generally triangular sections joined at a common imaginary base aligned with said second juncture and said ridge, said sections being bounded by said third and fourth junctures and forming fifth and sixth junctures with said wedge faces, each of said fifth and sixth junctures extending from the second juncture to near a respective end of the cutting land.

3. The invention of claim 2 wherein said second, third, fourth, fifth and sixth junctures comprise radius blends.

4. The invention of claim 3 wherein said radius blends fall within a range of 0.005–0.050 inch radius.

5. The invention of claim 4 wherein said radius blends are about 0.010 inch radius.

6. The insert of claim 1 wherein said chipbreaker faces lie closest to said nose at said connecting ridge.

7. The invention of claim 6 wherein said chipbreaker faces are defined by planar surfaces.

8. The insert of claim 1, wherein said body is generally diamond shaped having opposite acutely angled corners, both radiused and defining cutting edges, and one of said cutting lands and associated chip grooves is formed adjacent each of said acutely angled corners.

* * * * *